(12) United States Patent
Tseng (10) Patent No.: US 11,496,718 B2
(45) Date of Patent: Nov. 8, 2022

(54) METHOD AND DEVICE FOR HOMOGENIZING IMAGES OF MULTIPLE PROJECTORS

(71) Applicant: Coretronic Corporation, Hsin-Chu (TW)

(72) Inventor: Yung-Ling Tseng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/488,279

(22) Filed: Sep. 28, 2021

(65) Prior Publication Data

US 2022/0141430 A1 May 5, 2022

(30) Foreign Application Priority Data

Oct. 30, 2020 (CN) .......................... 202011186586.7

(51) Int. Cl.
*H04N 9/31* (2006.01)
*G03B 21/14* (2006.01)

(52) U.S. Cl.
CPC ......... *H04N 9/3147* (2013.01); *H04N 9/3191* (2013.01)

(58) Field of Classification Search
CPC .. H04N 9/3147; H04N 9/3182; H04N 9/3179; G03B 21/147; G03B 21/14
See application file for complete search history.

(56) References Cited

U.S. PATENT DOCUMENTS

2006/0181685 A1    8/2006    Hasegawa

FOREIGN PATENT DOCUMENTS

| CN | 1821861 | 8/2006 |
| TW | 201603581 | 1/2016 |

*Primary Examiner* — Ryan D Howard
(74) *Attorney, Agent, or Firm* — JCIPRNET (57) ABSTRACT

A method and device for homogenizing images of projectors is provided, and includes: projecting a first test pattern on respective projection images of projectors, projection images between a first and a second projectors among the projectors having an overlapping area, and the first test pattern having grid lines; selecting, in the grid lines of the first test pattern on the projection image of the first projector, an inner and an outer boundaries of the overlapping area of the first projector; selecting, in the grid lines of the first test pattern on the projection image of the second projector, an inner and an outer boundaries of the overlapping area of the second projector; gradually reducing a brightness from the inner to the outer boundaries of the overlapping area of the first projector; gradually reducing a brightness from the inner to the outer boundaries of the overlapping area of the second projector.

16 Claims, 9 Drawing Sheets

METHOD AND DEVICE FOR HOMOGENIZING IMAGES OF MULTIPLE PROJECTORS

CROSS-REFERENCE TO RELATED APPLICATION

This application claims the priority benefit of China application serial no. 202011186586.7, filed on Oct. 30, 2020. The entirety of the above-mentioned patent application is hereby incorporated by reference herein and made a part of this specification.

BACKGROUND

1. Technical Field

The disclosure relates to a method and a device for homogenizing images of multiple projectors.

2. Description of Related Art

In the previous projection image correction technology, in addition to warping correction, in order to meet the needs of large-image display, multiple projectors are used to stitch the projection images to project a large-image. Therefore, how to stitch images of a projector is also one of the focuses in this technical field. Further, how to perfectly stitch the projection images of multiple projectors into one image and make the blending area not obvious, that is, how to design the settings of the stitching and blending area and how to calculate it are not easy.

Figure 1A:
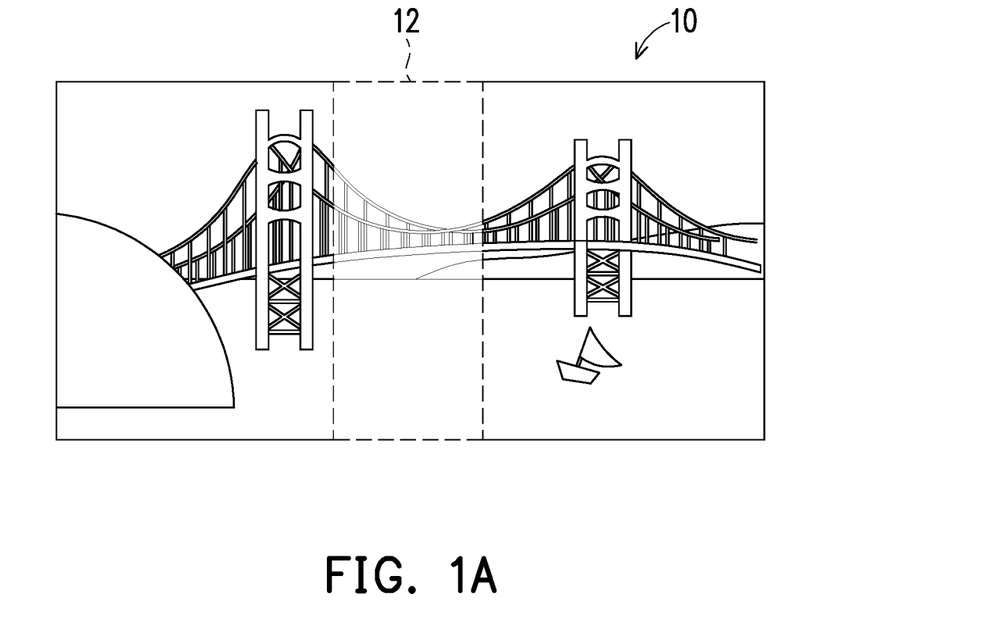
FIG. 1A and FIG. 1B are schematic diagrams of an adjustment of a stitching blending area before and after a stitching of two projection images.
Figure 1B:
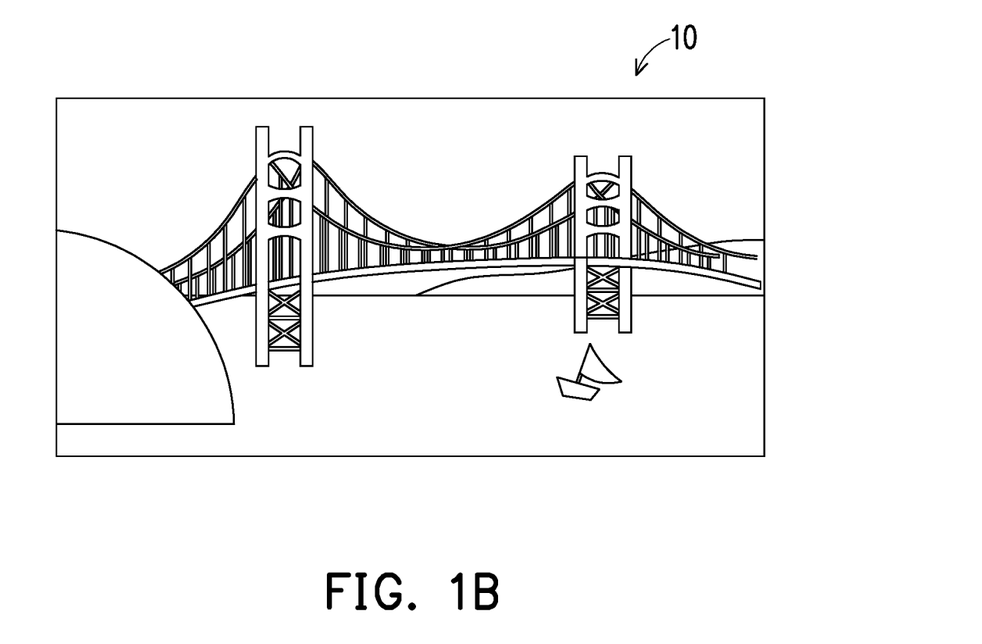

FIG. 1A and FIG. 1B are schematic diagrams of an adjustment of a stitching blending area before and after stitching of two projection images. FIG. 1A shows a stitching of projection images by two projectors to obtain a complete projection image 10 with a stitching blending area 12 in the middle. FIG. 1B shows that a brightness rendering of the blending area 12 is adjusted to be close to a brightness of a surrounding non-blending area. The settings of the blending area 12, in particular, determination of a boundary of a stitched blending area, brightness setting of the stitched blending area, or the like, for example, is a decisive factor for the effect of the images after stitching, and is one of the key technologies in the entire projection stitching correction process.

There are several commonly used methods for adjusting the blending area, such as using a camera and projectors, projecting corresponding test patterns and processing the captured images from the camera to mark the blending area of each projector, calculating the overlapping information of each area through the brightness formula, to be applied to the projection images of the projectors to achieve smooth stitching. Moreover, another method is to adjust manually using human eyes, together with computer software drawings, by adjusting the graphics in the software UI (user interface) to obtain the corresponding blending area, and then apply the brightness formula to calculate the overlapping information and finally provide the overlapping information to the projector for image stitching.

However, to obtain the blending area between the projection images through a camera, there is a very high demand for the image quality of the camera, such as high resolution, and the projection images cannot be overexposed, otherwise the calculated blending area will have a very large deviation, which will tend to lead to unsuccessful stitching due to the subsequent application of the overlapping information on the brightness formula.

Furthermore, there is a limit to the number of projection images that may be viewed by one camera. Therefore, when the stitching of the projection images of the projectors reaches a certain number, the camera image cannot cover all the projection range, and it is necessary to add other cameras to help viewing. However, different projector images will show the projection images of different viewing angles. Therefore, in order to obtain effective and meaningful data, subsequent algorithm calculations and design also require a lot of effort. In addition, the deviation will widen after many calculations, therefore there are many restrictions on use.

In addition, manual adjustment of the blending area largely relies on the judgement of the projected image by human eyes and the user's proficiency. Also, because there is no reference for quantitative data, the user is likely to feel that the operation is too complicated, clueless, and inconvenient during the calibration process.

Therefore, there is a need in the art for a technology that can easily and accurately locate the position and shape of the blending area.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides a method and device for homogenizing images of multiple projectors capable of easily and accurately locating a position and a shape of a blending area.

Based on the above description, according to an embodiment, the disclosure provides a method and a device for homogenizing images of multiple projectors, the method including: projecting a first test pattern on respective projection images of the multiple projectors, where a projection image of a first projector and a projection image of a second projector among the multiple projectors have an overlapping area, and the first test pattern is made up of multiple grid lines; selecting, in the grid lines of the first test pattern on the projection image of the first projector, an inner boundary and an outer boundary of the overlapping area of the first projector; selecting, in the grid lines of the first test pattern on the projection image of the second projector, an inner boundary and an outer boundary of the overlapping area of the second projector; gradually reducing a brightness from the inner boundary to the outer boundary of the overlapping area of the first projector, and gradually reducing a brightness from the inner boundary to the outer boundary of the overlapping area of the second projector.

According to another embodiment, the disclosure provides a device for homogenizing images of multiple projectors, including a user interface and a processor. The processor is capable of executing: projecting a first test pattern on respective projection images of the multiple projectors, where a projection image of a first projector and a projection image of a second projector among the multiple projectors have an overlapping area, and the first test pattern is made up of multiple grid lines; selecting, in the grid lines of the first test pattern on the projection image of the first projector, an inner boundary and an outer boundary of the overlapping area of the first projector; selecting, in the grid lines of the first test pattern on the projection image of the second projector, an inner boundary and an outer boundary of the overlapping area of the second projector; gradually decreasing a brightness from the inner boundary to the outer boundary of the overlapping area of the first projector, and gradually decreasing a brightness from the inner boundary to the outer boundary of the overlapping area of the second projector.

Base on the above, the method and device for homogenizing the images of multiple projectors of the embodiment may provide an intuitive and fast adjustment method, making the adjustment of the boundary of the overlapping area (blending area) easier, and the applicable range is wider without being affected by any device. In addition, through the disclosure, the pitch of grid lines (sub-areas) may be dynamically adjusted (such as the aforementioned first test pattern, second test pattern, or the like), such that the use can be more tailored, and the shape and position of the overlapping area can be obtained more accurately.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

It is to be understood that other embodiment may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

According to the embodiment of the disclosure, an overlapping area of projected images is directly observed through the human eye, and projectors are used to project a calibration template (test pattern) with dynamically adjustable pixel size, so as to directly select and locate the position and shape of the current blending area on the projection image.

The method and device for homogenizing images (e.g., white image) of multiple projectors in the embodiment may be applied to stitching between multiple projectors. However, for convenience of description, the following uses two projectors as an example, but it is not intended to limit the implementation of the disclosure.

Figure 2A:
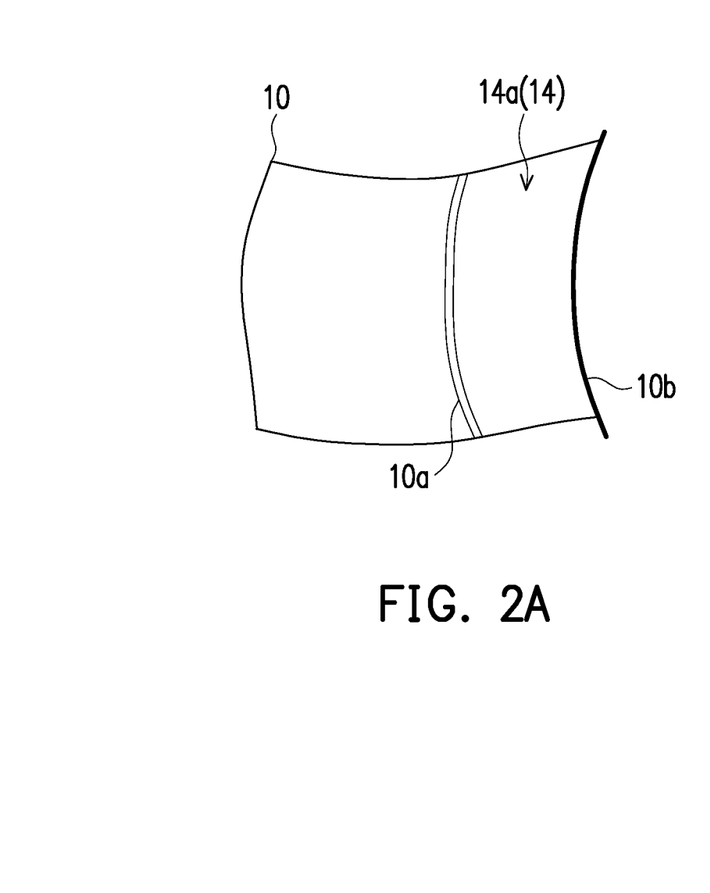
FIG. 2A and FIG. 2B are schematic diagrams of a brightness adjustment mechanism of a stitching of two projectors of the embodiment.
Figure 2B:
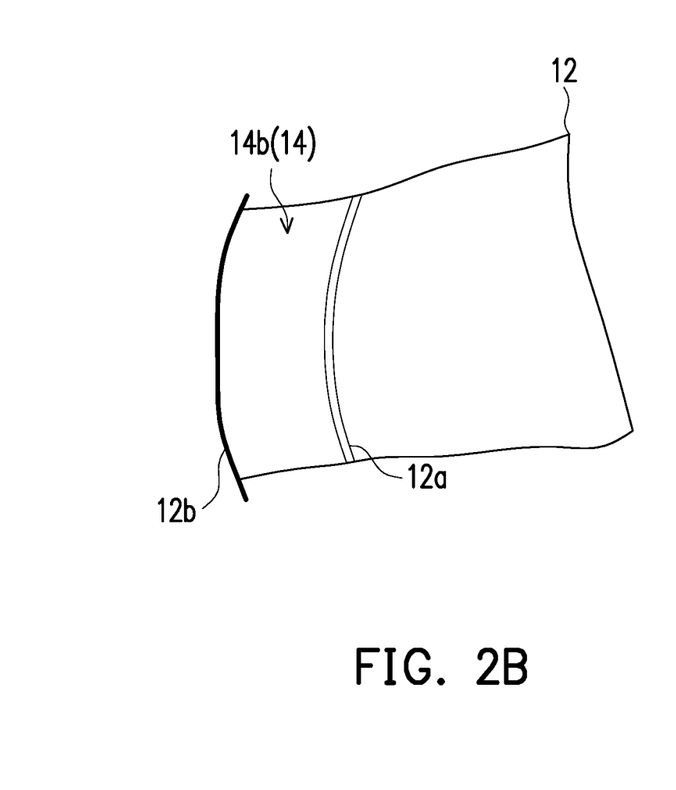

FIG. 2A and FIG. 2B are schematic diagrams of a brightness adjustment mechanism of a stitching of images of two projectors in the embodiment. As shown in FIG. 2A and FIG. 2B, there is an overlapping area 14 between a projection image 10 of a first projector and a projection image 12 of a second projector; that is, a blending area 14a of the projection image 10 and a blending area 14b of the projection image 12 are overlapped to form an overlapping area 14. In FIG. 2A and FIG. 2B, the two projection images 10 and 12 are separated, so as to facilitate understanding. In order to achieve smooth image stitching, after applying a brightness formula, the blending area 14a of the projection image 10 obtains a gradual change from an inner boundary 10a to an outer boundary 10b, with a brightness decreasing goes from 1 (maximum) to 0 (with distance as a width of the blending area 14a). Also, the blending area 14b of the projection image 12 applies a brightness formula to obtain a gradual change from an inner boundary 12a to an outer boundary 12b. A brightness of the blending area 14b is gradually decreased goes from 1 (maximum) to 0 (with the distance as a width of the blending area 14b). Thus, when the two symmetrical blending areas 14a and 14b are stitched, the total brightness of each pixel of the stitched blending area 14a and the stitched blending area 14b (the overlapping area) is equal to 1. In other words, in the method for homogenizing the images of multiple projectors described above, the brightness changes from the inner boundary 10a (12a) to the outer boundary 10b (12b) of the blending area 14a (14b), decreasing from a maximum brightness of the projector to a minimum brightness of the first projector (the second projector).

In addition, the adjustment of the blending area is mainly to superimpose the brightness value of each pixel in the overlapping area into a similar range through superimposition calculation of the overlapping area. In this way, an originally obvious overlapping boundary may be rendered almost invisible, and the overall brightness of the overlapping area is close to the brightness of a non-overlapping area (e.g., white image). Here, relative brightness values are adopted for the brightness adjustment. According to the embodiment, the RGB parameters of each projector may be preset to be close, and the brightness may all be the brightest (equal to 1). The brightness of the overlapping area is adjusted when there is no deviation in the projection color, such that the homogeneity of the adjusted stitched images may be improved.

Figure 3:
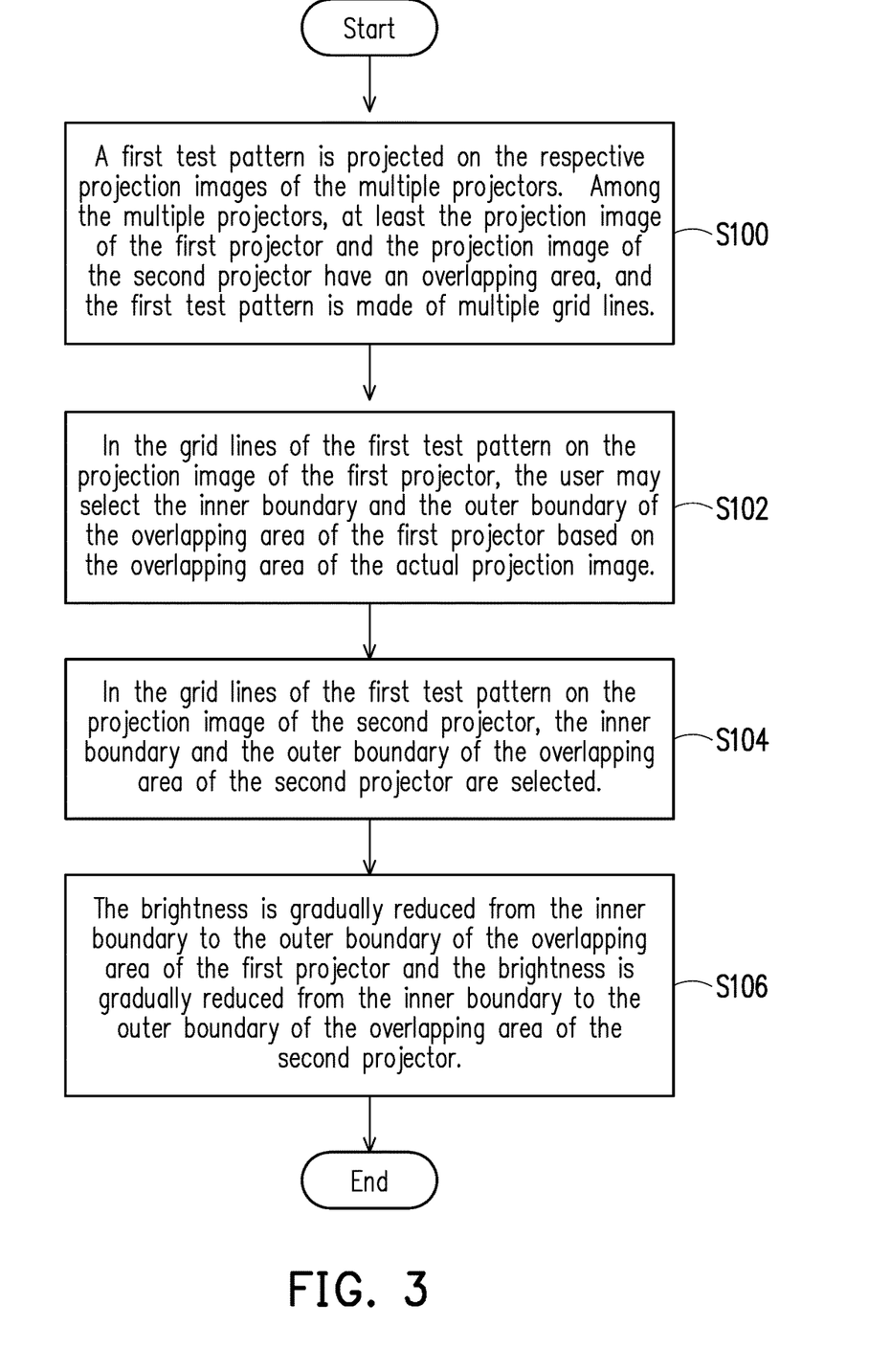
FIG. 3 is a schematic flowchart of a method for homogenizing images of multiple projectors according to the embodiment.

Next, a brief description will be given of the method for homogenizing the images of multiple projectors in the embodiment. FIG. 3 is a schematic flowchart of a method for homogenizing images of multiple projectors according to the embodiment.

As shown in FIG. 3, in step S100, a first test pattern is projected (displayed) on the respective projection images of the multiple projectors (the multiple projectors project the first test pattern). Among the multiple projectors, at least the projection image of the first projector and the projection image of the second projector have an overlapping area (e.g., the blending area), and the first test pattern is made up of multiple grid lines (as referred to as sub-areas). In other words, the projection image of the first projector and the projection image of the second projector among the multiple projectors may have an overlapping area, the projection image of the second projector and a projection image of a third projector among the multiple projectors may also have an overlapping area, and different overlapping areas may also overlap or separate from each other, and so on.

Next, in step S102, in the grid lines of the first test pattern on the projection image of the first projector, the user may select the inner boundary and the outer boundary of the overlapping area (i.e., the blending area) of the first projector based on the overlapping area of the actual projection images. In addition, in step S104, in the grid lines of the first test pattern on the projection image of the second projector, the inner boundary and the outer boundary of the overlapping area (i.e., the blending area) of the second projector are selected. So far, the inner boundary and the outer boundary of the overlapping area of the test patterns projected by the first projector and the second projector can be correctly located.

Finally, in step S106, the brightness is gradually reduced from the inner boundary to the outer boundary of the overlapping area of the first projector and the brightness is gradually reduced from the inner boundary to the outer boundary of the overlapping area of the second projector. In this step, the brightness of the blending area is adjusted in the selected overlapping area.

Figure 4A:
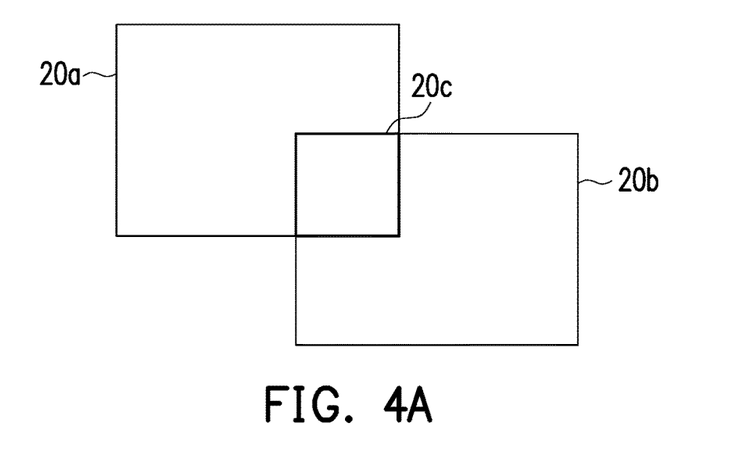
FIG. 4A and FIG. 4E show a method of selecting an inner boundary and an outer boundary of an overlapping area of the embodiment.

Next, referring to FIG. 4A to FIG. 4E, the method of selecting the inner boundaries and the outer boundaries of the overlapping area of the embodiment will be described in detail. First, as shown in FIG. 4A, two projectors respectively project a projection image 20a and a projection image 20b, and there is an overlapping area (blending area) 20c between the projection image 20a and the projection image 20b. Next, using the method of the embodiment of the disclosure, the inner boundary and the outer boundary of the overlapping area 20c are selected for subsequent homogenization of the projection images.

Figure 4B:
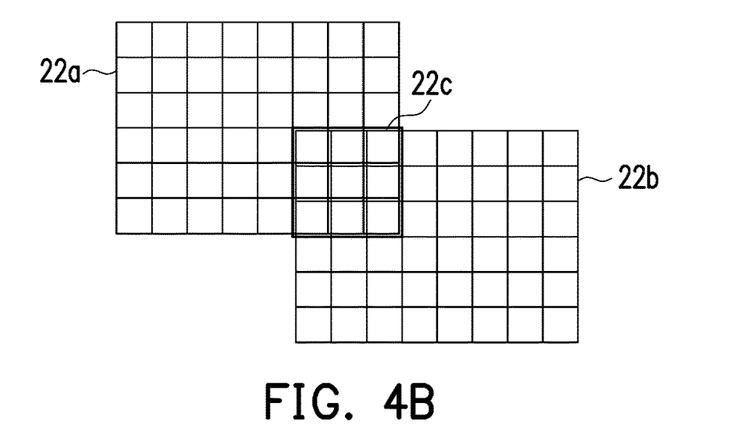

Next, as shown in FIG. 4B, a first test pattern 22a and a first test pattern 22b are projected by the first projector and the second projector, respectively, with an overlapping area (blending area) 22c in between. The first test pattern 22a and the first test pattern 22b projected by the first projector and the second projector are respectively made up of multiple grid lines, that is, having multiple grids as shown in FIG. 4B. Each grid may be defined as the sub-area of the first test pattern 22a and the first test pattern 22b.

Figure 4C:
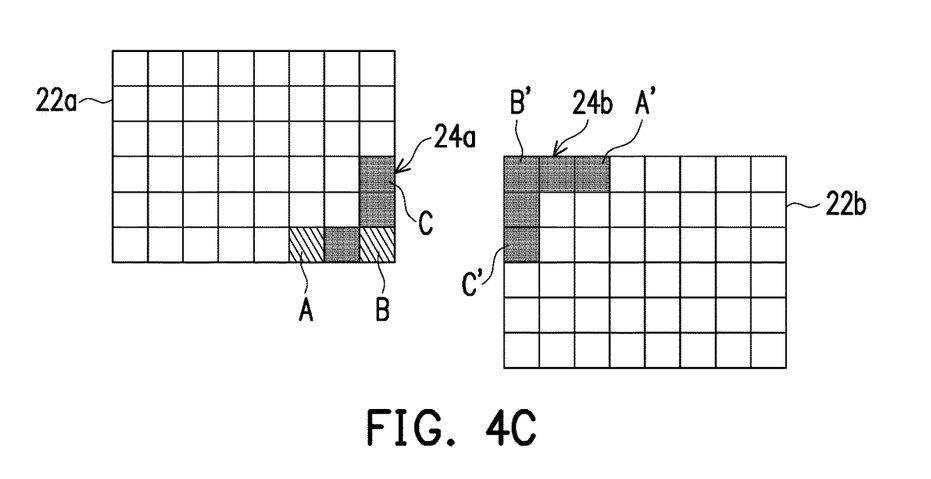

When the projection image is switched from FIG. 4A to the correction template with dynamically adjustable pixel size (unit size) shown in FIG. 4B, then, as shown in FIG. 4C, the outer boundary is selected on the first test pattern 22a projected by the first projector, and the outer boundary is selected on the first test pattern 22b projected by the second projector.

As shown in FIG. 4C, in the first test pattern 22a that serves as the projection image, the user then proceeds to select the outer boundary of the overlapping area 22c. The selection method may be that the user clicks on the grid (sub-area) on the projected first test pattern 22a; that is, the outer boundary of the current overlapping area 22c is selected by grid selection. For example, near the outer boundary of the overlapping area 22c at a lower right corner of the first test pattern 22a, the user may first select grids (sub-areas) as the outer boundaries, such as an outer boundary 24a (five sub-areas) of the first test pattern 22a and an outer boundary 24b (five sub-areas) of the first test pattern 22b shown in FIG. 4C.

At this time, as shown in FIG. 4C, at the beginning, the selected sub-areas (such as sub-areas A, B, C, A', B', C', or the like) may be marked through a system. When the sub-area is determined to be the outer boundary, the label of the sub-area is changed so as to indicate that the sub-area has been regarded as a sub-area of the outer boundary 24a, such as but not limited to indicating the sub-area that has not been confirmed as the outer boundary with "slashes", and indicating the sub-area that has been confirmed as the outer boundary 24a with "dots" (the above-mentioned "slashes" and "dots" may be marked in different colors in practical application). Thus, the outer boundary 24a of the first test pattern 22a and the outer boundary 24b of the first test pattern 22b may be determined.

Figure 4D:
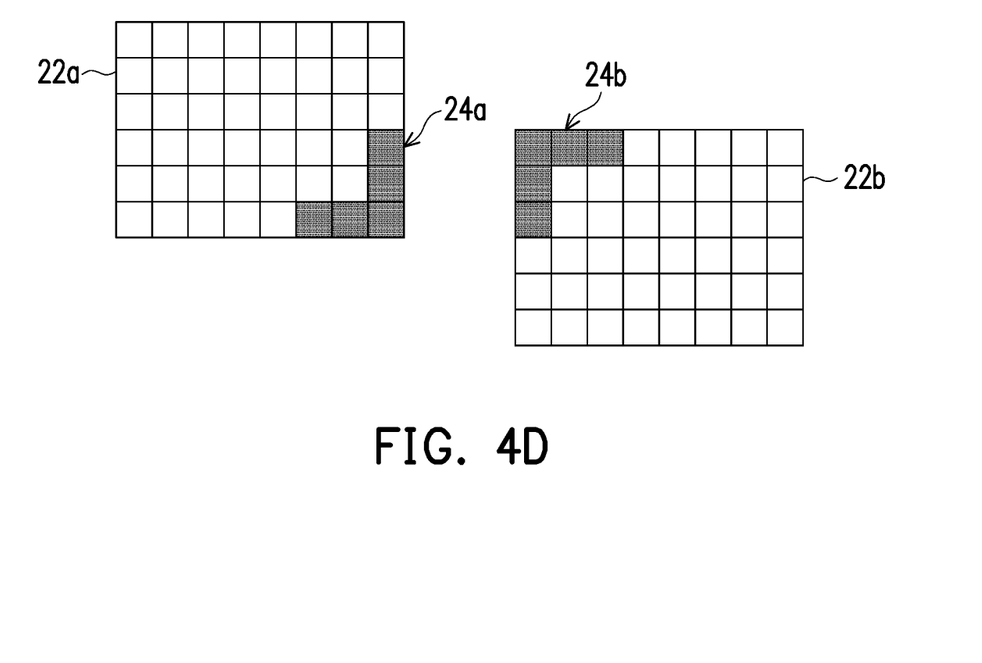
Figure 4E:
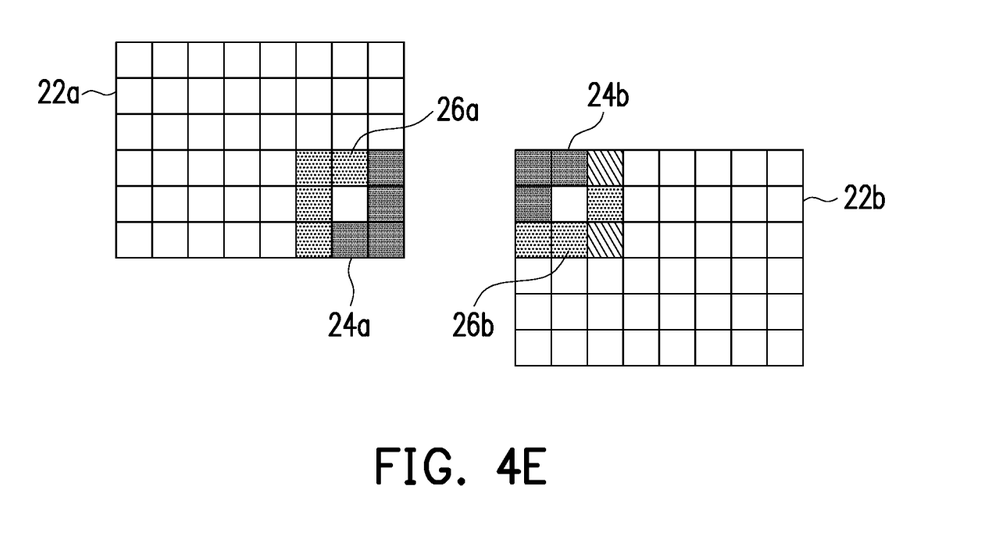

FIG. 4D shows the outer boundary 24a (sub-areas with dots) of the overlapping area 22c of the first test pattern 22a (first projector), and the outer boundary 24b (sub-areas with dots) of the overlapping area 22c of the first test pattern 22b (second projector) after selection. Next, as shown in FIG. 4E, after the outer boundary 24a and the outer boundary 24b are selected, the inner boundaries of the overlapping area 22c are selected. The method of selecting the inner boundary 26a and the inner boundary 26b is basically the same as the method of selecting the outer boundaries.

Based on the same method described above, an inner boundary 26a of the overlapping area 22c (as shown in FIG. 4B) of the first test pattern 22a in FIG. 4E has been selected and confirmed, and an inner boundary 26b of the overlapping area 22c of the first test pattern 22b still has sub-areas marked with "slashes" left to be determined. After all the determinations are completed, the inner boundary 26a of the overlapping area 22c of the first test pattern 22a (first projector) and the inner boundary 26b of the overlapping area 22c of the first test pattern 22b (second projector) have been selected and determined.

In this way, the projection image may be directly observed through the human eye, and the inner boundary 26a, the inner boundary 26b, the outer boundary 24a, and the outer boundary 24b of the overlapping area 22c may be intuitively and surely selected. The selected outer boundary 24a and the selected outer boundary 24b can define the boundaries with the aforementioned brightness of 0, and the inner boundary 26a and the inner boundary 26b can define the aforementioned boundaries with the brightness of 1. Then, making use of the brightness formula, the brightness is gradually decreased from the inner boundary 26a to the outer boundary 24a of the overlapping area 22c of the first projector, and the brightness is gradually reduced from the inner boundary 26b to the outer boundary 24b of the overlapping area 22c of the second projector, thereby achieving the homogeneity of the brightness of the overlapping area 20c between the two projectors.

In addition, in the above description example, the selection of boundaries starts by firstly selecting the outer boundaries, and then selecting the inner boundaries. However, the embodiment is not limited thereto. Of course, the user may also start the selection from the inner boundaries, and then proceeds to select the outer boundaries.

In the above selection method, for example, in the first test pattern 22a shown in FIG. 4C, the sub-area A marked with "slashes" is taken as the starting point or end point of the outer boundary 24a, a mouse is clicked at the starting point and held down, and then released when dragged to the end point (such as the sub-area C on the first test pattern 22a) so as to select the outer boundary 24a.

At this time, the above operations may be performed on a computer screen that serves as the user interface of the user, so as to select the outer boundaries; that is, the computer screen may present the grid lines (sub-areas) of the first test pattern 22a and the test pattern 22b, and then operations may be performed using input tools such as the mouse. In addition, it is also possible to use a portable device, such as any device like a mobile phone or a tablet, and perform the above-mentioned click operation on the display screen. In other words, the inner boundary 26a and the outer boundary 24a of the overlapping area 22c of the selected first projector, and the inner boundary 26b and outer boundary 24b of the overlapping area 22c of the second projector may be selected on the user interface.

Moreover, when selecting sub-areas, in addition to dragging from the start point to the end point, it is also possible to continuously click all the passed sub-areas so as to select the outer boundary 24a and the outer boundary 24b. In other words, the inner boundary 26a, the inner boundary 26b, the outer boundary 24a, and the outer boundary 24b of the overlapping area 22c of the first or second projector may be selected by clicking each sub-area of the first test pattern, or by clicking to select all the sub-areas passed by a line formed when dragging from the first sub-area to the last sub-area.

Further, when the projection image has sensing functions, such as touch, laser curtain, gesture capture, or the like, the user may also directly manipulate and click on the sub-areas of the first test pattern 22a and the test pattern 22b on the projection image, so as to locate the inner boundary 26a, the inner boundary 26b, the outer boundary 24a and the outer boundary 24b of the overlapping area 22c. In other words, the inner boundary 26a and the outer boundary 24a of the overlapping area 22c of the selected first projector, and the inner boundary 26b and the outer boundary 24b of the overlapping area 22c of the second projector can be selected on the projection images. Namely, the selection of the inner boundary 26a and the outer boundary 24a of the overlapping area 22c of the first projector, and the selection of the inner boundary 26b and the outer boundary 24b of the overlapping area 22c of the second projector can be performed directly on the projection images.

Also, in the above method, the first test pattern 22a projected by the first projector and the first test pattern 22b projected by the second projector may be projected simultaneously. However, the first test pattern 22a and the first test pattern 22b of the first projector and the second projector may also be projected time-sharingly; that is, each test pattern is projected at different times, for example, the first test pattern 22a of the first projector and the projection image 20b of the second projector at a first time (such as step S102), and the projection image 20a of the first projector and the first test pattern 22b of the second projector at a second time (such as step S104).

In addition, in the above method, the first test pattern 22a and the first test pattern 22b projected by the first projector and the second projector may be the same, but when projecting time sharingly, the pitch (resolution) of the grid lines of the test patterns projected by the first projector and the second projector may be different.

The blending area of the projection image (the overlapping area 20c as shown in FIG. 4A) is not necessarily flat and regular in shape, and may usually be irregular in shape. Therefore when the size of the grid pixels (and the aforementioned grid lines or sub-areas) of the test pattern is too large, a fine and actual blending area cannot be obtained. Therefore, it is very important to be able to dynamically adjust the pitch of the grid lines. The finer the grid lines (sub-areas) are used for adjustment, the closer the area and shape of the blending area can be approached, the calculated overlapping area information will be more detailed, and the effect of selecting the inner boundaries and the outer boundaries of the overlapping area will be better. Therefore, the user can change the pitch (that is, the range of each grid pixel) of the sub-areas (grid lines) of the test pattern so as to select the boundaries, such that the actual position of the boundary of the actual overlapping area (blending area) can be approached more accurately.

Figure 5A:
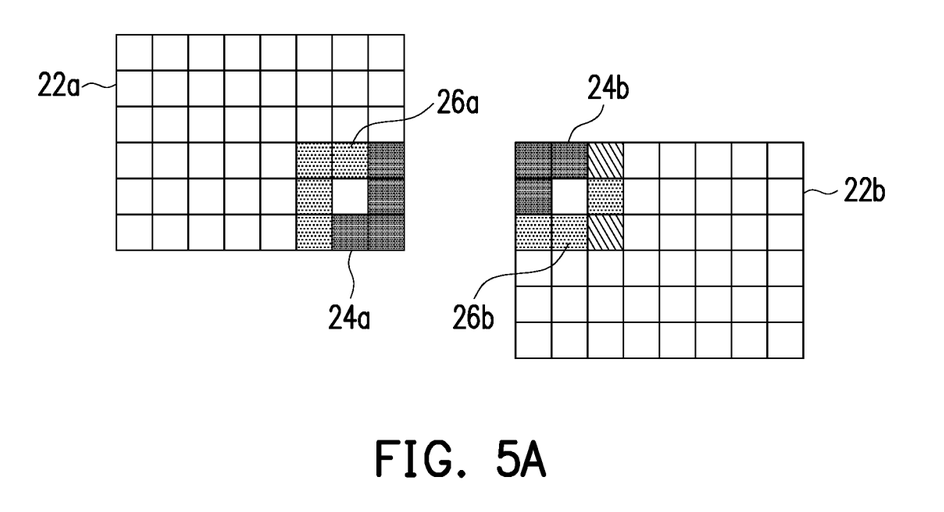
FIG. 5A and FIG. 5B show a variation of a method of selecting an inner boundary and an outer boundary of an overlapping area of the embodiment.
Figure 5B:
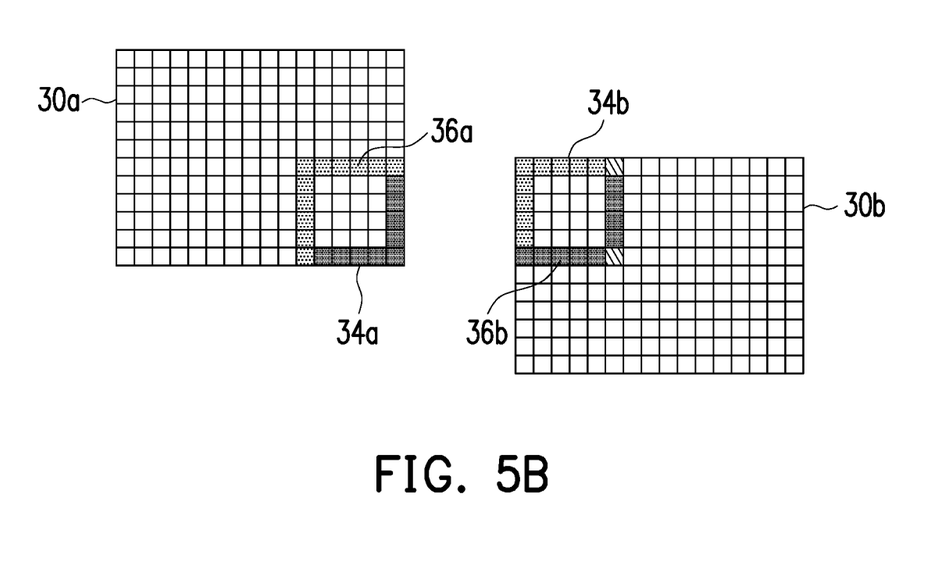

Therefore, FIG. 5A and FIG. 5B show a variation of a method of selecting the inner boundaries and the outer boundaries of an overlapping area of the embodiment. As shown in FIG. 5A, after the inner boundary 26a, the inner boundary 26b, the outer boundary 24a, and the outer boundary 24b of the overlapping area of the first test pattern 22a and the first test pattern 22b of each projector are selected by the method of FIG. 4A to FIG. 4E, if the inner boundaries and the outer boundaries of the overlapping area still cannot be accurately selected, the second test pattern may also be projected, according to the method of the embodiment.

As shown in FIG. 5B, a second test pattern 30a and a second test pattern 30b are projected on the respective projection images of the first projector and the second projector (two projectors are used as an example in the embodiment, but there may be more than one in practical application). The pitch of the grid lines of the second test pattern 30a and the second test pattern 30b is smaller than the pitch of the grid lines of the first test pattern 22a and the first test pattern 22b. As shown in FIG. 5B, in the embodiment, the projector may be further made to project the second test pattern of even higher resolution (even smaller grid line pitch) to select an inner boundary 36a, an inner boundary 36b, an outer boundary 34a, an outer boundary 34b of the overlapping area, so as to more accurately select the inner boundaries and the outer boundaries. In addition, in the example shown in FIG. 5B, the only difference is that the resolution of the second test pattern 30a and the second test pattern 30b (that is, the distance between the grid lines is reduced) is increased, and the other methods for selecting the inner boundaries and the outer boundaries are the same as those shown in FIG. 4A to FIG. 4E, therefore the description is omitted here.

Further, when the inner boundaries and the outer boundaries of the overlapping area are selected making use of the first test pattern 22a and the first test pattern 22b, and it is found that the inner boundaries and the outer boundaries cannot be accurately located, the second test pattern 30a and the second test pattern 30b may be further projected so as to locate the inner boundary 36a, the inner boundary 36b, the outer boundary 34a, and the outer boundary 34b of the overlapping area. In addition, the second test pattern 30a and the second test pattern 30b may also be re-projected to re-locate the inner boundary 36a, the inner boundary 36b, the outer boundary 34a, and the outer boundary 34b of the overlapping area.

Therefore, in the embodiment, the inner boundaries and the outer boundaries of the overlapping area may be adjusted and located by making use of test patterns having different degrees of fineness (the size of the pitch between the grid lines). The smaller the grid line pitch, that is, the higher the resolution of the test pattern, the more the user can adjust the irregular overlapping area, and find the position and shape closest to the overlapping area through the multi-point (sub-area) selection method.

Figure 6A:
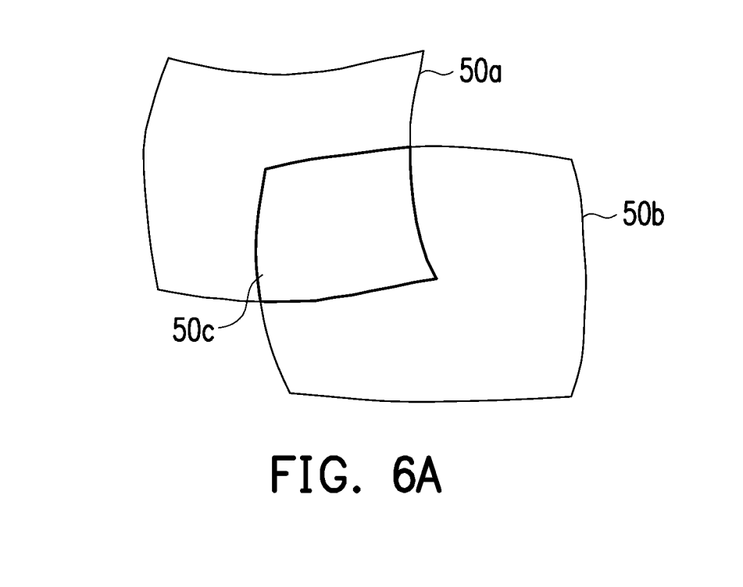
FIG. 6A to FIG. 6D are schematic diagrams of a method for selecting an inner boundary and an outer boundary of an irregular overlapping area according to the embodiment.

FIG. 6A to FIG. 6D are schematic diagrams of a method for selecting the inner boundaries and the outer boundaries of an irregular overlapping area according to the embodiment. As shown in FIG. 6A, the first projector and the second projector respectively project a projection image 50a and a projection image 50b, and there is an overlapping area (blending area) 50c between the projection image 50a and the projection image 50b. Next, using the method of the embodiment of the disclosure, the inner boundaries and the outer boundaries of the overlapping area 50c are selected for subsequent homogenization of the projection images.

Figure 6B:
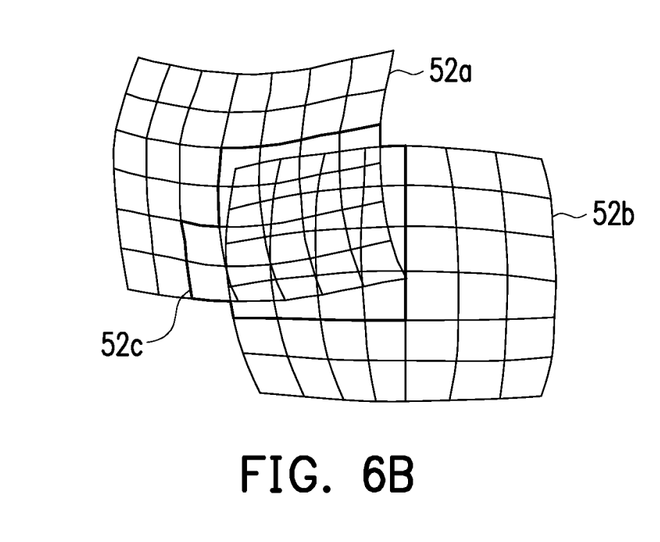

Next, as shown in FIG. 6B, a first test pattern 52a and a first test pattern 52b are projected by the first projector and the second projector, respectively, with an overlapping area 52c in between. The first test pattern 52a and the first test pattern 52b projected by the first projector and the second projector are respectively made up of multiple areas (sub-areas) divided by the multiple grid lines.

Figure 6C:
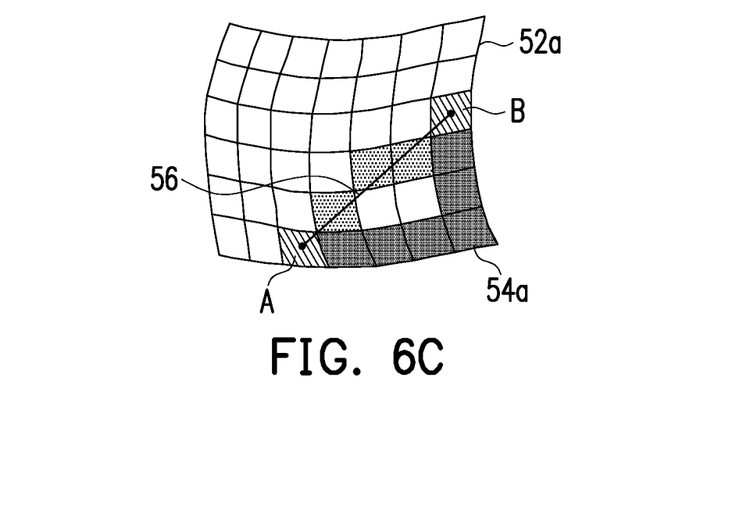

After the projection image is switched from FIG. 6A to the calibration template with dynamically adjustable pixel size shown in FIG. 6B, then as shown in FIG. 6C, the outer boundary is selected on the first test pattern 52a projected by the first projector. The selection of the outer boundary on the first test pattern 52b projected by the second projector is the same as in the first projector, and the method is the same as the method shown in FIG. 4A to FIG. 4E. Here, only the first test pattern 52a is taken as an illustrative example.

As shown in FIG. 6C, in the first test pattern 52a that serves as the projection image, the user then proceeds to select the outer boundary 54a of the overlapping area. The method for selecting the outer boundary 54a may be the method shown in FIG. 4A to FIG. 4E, which will not be described here, and the method for selecting the inner boundaries will be emphasized.

Figure 6D:
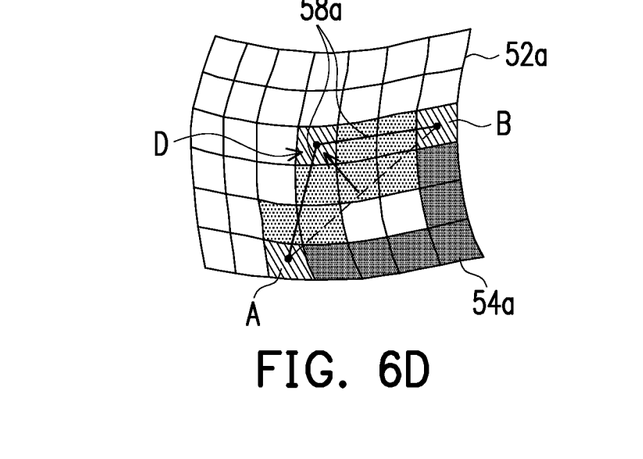

As shown in FIG. 6C and FIG. 6D, an inner boundary 58a of the overlapping area of the selected first test pattern 52a is selected. First, in the selected outer boundary 54a, the end positions (diagonal positions of the boundary), that is, the sub-area A and the sub-area B, are connected to form a diagonal line 56 (as shown in FIG. 6C). Then, an appropriate position on the diagonal line 56 is selected as a starting point (dragging point) to drag the diagonal line 56, such that the line segment of the diagonal line 56 forms a bending angle (the end points of the diagonal line 56 are fixed), until reaching a sub-area D on the boundary of the actual overlapping area.

Finally, as shown in FIG. 6D, the inner boundary 58a of the overlapping area of the first test pattern 52a can be located more quickly. Moreover, the inner boundary and the outer boundary of the overlapping area of the first test pattern 52b may also be located in this way. Also, in the example shown in FIG. 6A to FIG. 6D, the outer boundary 54a is located first, and then a diagonal line is formed at the diagonal position of the boundary, and the diagonal line is dragged to reach the position of the inner boundary. Conversely, the inner boundary may be located first, and then the outer boundary is reached by dragging in the same way. That is, when selecting the inner or outer boundary of the overlapping area of the first or second projector, a diagonal line is formed at the diagonal sub-area of the inner or outer boundary where the first test pattern is located, and then the diagonal line is dragged, such that the diagonal line forms a bending line, so as to select the outer boundary or the inner boundary.

Similarly, the locating and selection of the inner boundaries and the outer boundaries of the embodiment may be performed as shown in FIG. 4A to FIG. 4E, for example, on a computer screen, on a display of a terminal device, or directly on a projection image.

Figure 7A:
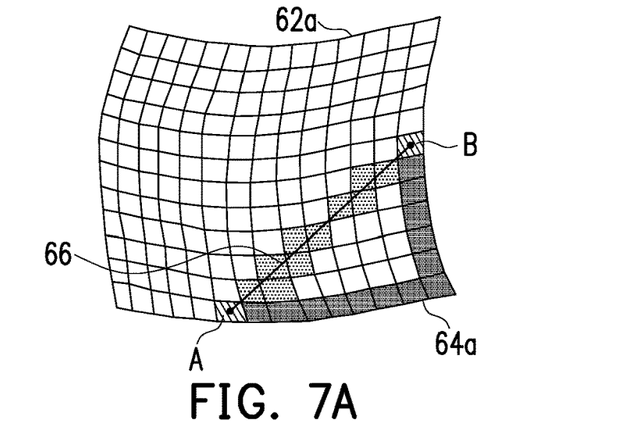
FIG. 7A to FIG. 7C show variations of method in FIG. 6A to FIG. 6D.
Figure 7B:
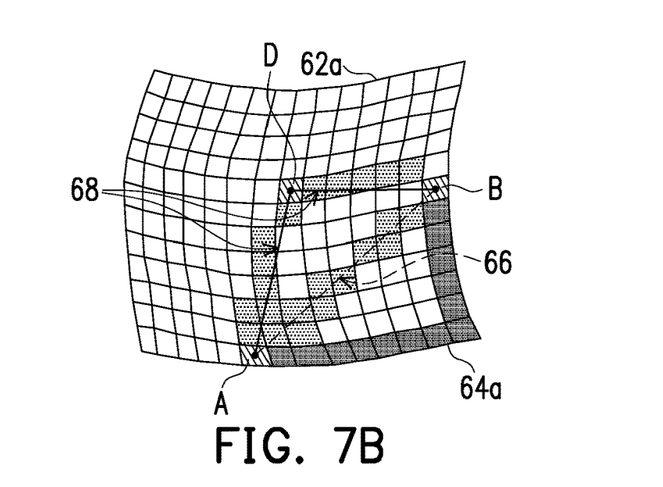
Figure 7C:
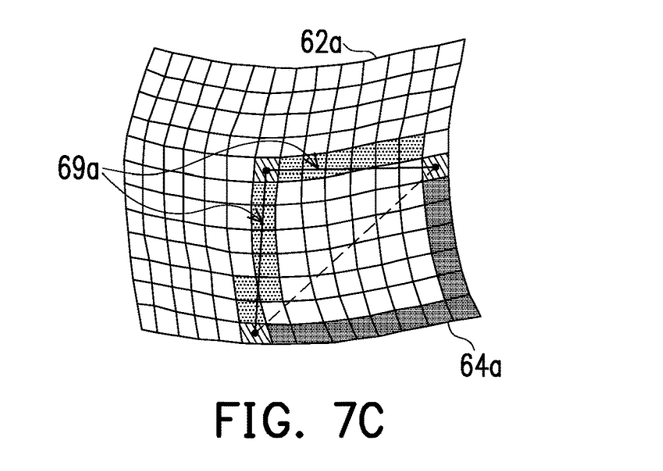

FIG. 7A to FIG. 7C show variations of method in FIG. 6A to FIG. 6D. In the embodiment, similar to the above embodiment, when the inner boundary 58a and the outer boundary 54a of the overlapping area 52c still cannot be accurately selected by the method shown in FIG. 6A to FIG. 6D, according to the method of the embodiment, a second test pattern may also be projected. That is, in step S102, the first projector is changed to project a second test pattern 62a and the second projector is changed to project a second test pattern (not shown). Here, only the second test pattern 62a is taken as an illustrative example. The pitch of the grid lines of the second test pattern 62a is smaller than the pitch of the grid lines of the first test pattern 52a; that is, the second test pattern 62a have a higher resolution.

As with the above description, in FIG. 7A, the outer boundary 64a of the overlapping area is selected on the second test pattern 62a, and then the sub-area A and the sub-area B at two ends of an outer boundary 64a (diagonal positions of the outer boundary) are connected to form a diagonal line 66. Next, as shown in FIG. 7B, using the appropriate position of the diagonal line 66 as a starting point, the diagonal line 66 is dragged to reach the sub-area D to form a bending line 68. Next, as shown in FIG. 7C, each sub-area of the bending line 68 is checked so as to determine whether it is a sub-area of the inner boundary, and finally an inner boundary 69a is selected and confirmed.

Figure 8:
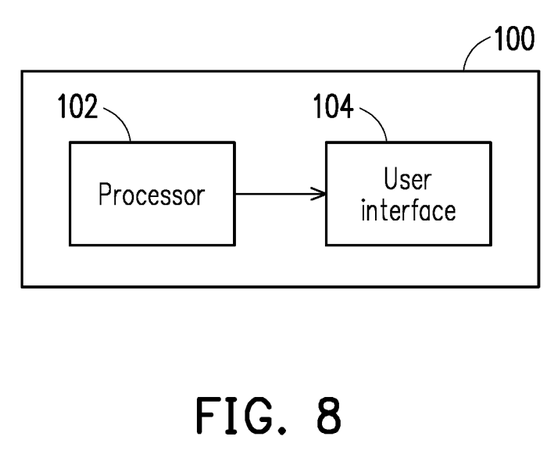
FIG. 8 is a schematic diagram of modules of a device for homogenizing images of multiple projectors according to another embodiment of the disclosure.

FIG. 8 is a schematic diagram of modules of a device for homogenizing images of multiple projectors according to another embodiment of the disclosure. As shown in FIG. 8, a device 100 for homogenizing images of multiple projectors includes at least a processor 102 and a user interface 104. The processor 102 may be, for example, a central processing unit (CPU), or other programmable general-purpose or special-purpose microprocessor, digital signal processor (DSP), programmable control device, application specific integrated circuits (ASIC), programmable logic device (PLD) or other similar devices or a combination of these devices. The user interface 104 may serve as a user interface for various boundary selecting operations of the aforementioned methods, such as a computer screen, a display of a terminal device, or a projection image. The processor 102 is configured to control the user interface 104.

In addition, the processor 102 may execute: projecting the first test pattern on the respective projection images of the multiple projectors. Among the multiple projectors (in the embodiment, two projectors are used for illustration), at least the projection image of the first projector and the projection image of the second projector have an overlapping area, and the first test pattern (such as 22a, 22b of FIG. 4, or the like) are made up of multiple grid lines (sub-areas). That is, the steps shown in FIG. 4B or FIG. 6B are executed.

In addition, the processor 102 may also execute: selecting, in the grid lines of the first test pattern on the projection image of the first projector, the inner boundary and the outer boundary of the overlapping area of the first projector; and selecting, in the grid lines of the first test pattern on the projection image of the second projector, the inner boundary and the outer boundary of the overlapping area of the second projector. In other words, the processor 102 executes the steps shown in FIG. 4C to FIG. 4E, FIG. 6C to FIG. 6D, and so on.

Moreover, the processor 102 may also perform the step of gradually reducing the brightness from the inner boundary to the outer boundary of the overlapping area of the first projector, and gradually reducing the brightness from the inner boundary to the outer boundary of the overlapping area of the second projector.

Further, the processor 102 may also execute: projecting the second test pattern on the respective projection images of the multiple projectors, where the pitch of the grid lines of the second test pattern is smaller than the pitch of the grid lines of the first test pattern. That is, the processor can perform the operations shown in FIG. 5B, and FIG. 7A to FIG. 7C.

In addition, in the above-described method, various situations and operation modes may be all executed by cooperating the processor 102 and the user interface 104 of the device 100 for homogenizing images of multiple projectors, which will not be described here.

In summary, the method and device for homogenizing the images of multiple projectors of the embodiment may provide an intuitive and fast adjustment method, making the adjustment of the boundary of the overlapping area (blending area) easier, and the applicable range is wider without being affected by any device.

Also, through the disclosure, the pitch of grid lines (sub-areas) may be dynamically adjusted (such as the aforementioned first test pattern, second test pattern, or the like), such that the use can be more tailored, and the shape and position of the overlapping area can be obtained more accurately.

Moreover, the adjustable range of the disclosure can be changed by different projection screens, which can effectively and smoothly stitch the overlapping area of multiple projectors, and can be applied to the stitching of multiple projections in various situations, for example, to curved surfaces, wavy surfaces, dome projections, projection mappings, or the like.

Furthermore, the disclosure may be applied to a variety of different projection application scenarios. Because it is designed to directly adjust the projection image, it is not limited by any software or device, and the application can be based on the combination of models, or be adjusted directly on the interactive device.

However, the above are only preferred embodiments of the disclosure, and should not be used to limit the scope of implementation of the disclosure, that is, all simple equivalent changes and modifications made in accordance with the claims of the disclosure and the content of the disclosure are still within the scope of the patent for the disclosure. In addition, any embodiment or claim of the disclosure does not have to achieve all the objectives or advantages or features disclosed in the disclosure. In addition, the terms "first" and "second" mentioned in this specification or claims are only configured to name the elements or to distinguish different embodiments or ranges, and are not used to restrict the upper or lower limit of the number of elements.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in the art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the grid lines requiring an abstract, which will allow a searcher to quickly ascertain the subject matter of the technical disclosure of any patent issued from the disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A method for homogenizing images of a plurality of projectors, comprising:
    projecting a first test pattern on respective projection images of the plurality of projectors, wherein a projection image of a first projector and a projection image of a second projector among the plurality of projectors have an overlapping area, and the first test pattern is made up of a plurality of grid lines;
    selecting, in the grid lines of the first test pattern on the projection image of the first projector, an inner boundary and an outer boundary of the overlapping area of the first projector;
    selecting, in the grid lines of the first test pattern on the projection image of the second projector, an inner boundary and an outer boundary of the overlapping area of the second projector; and
    gradually decreasing a brightness from the inner boundary to the outer boundary of the overlapping area of the first projector, and gradually decreasing a brightness from the inner boundary to the outer boundary of the overlapping area of the second projector.

2. The method for homogenizing the images of the plurality of projectors according to claim 1, further comprising:
    projecting a second test pattern on respective projection images of the plurality of projectors, wherein a pitch of the grid lines of the second test pattern is smaller than a pitch of the grid lines of the first test pattern.

3. The method for homogenizing the images of the plurality of projectors according to claim 1, wherein the first test pattern projected by the first projector and the first test pattern projected by the second projector are projected simultaneously or time-sharingly.

4. The method for homogenizing the images of the plurality of projectors according to claim 1, wherein the selection of the inner boundary and the outer boundary of the overlapping area of the first projector, and the selection of the inner boundary and the outer boundary of the overlapping area of the second projector are performed on the projection images.

5. The method for image homogenizing the images of the plurality of projectors according to claim 1, wherein the inner boundary and the outer boundary of the overlapping area of the first projector, and the inner boundary and the outer boundary of the overlapping area of the second projector are selected on a user interface.

6. The method for homogenizing the images of the plurality of projectors according to claim 1, wherein the inner boundary and the outer boundary of the overlapping area of the first projector or the second projector are selected by clicking each sub-area of the first test pattern, or by dragging from a first sub-area to a last sub-area.

7. The method for homogenizing the images of the plurality of projectors according to claim 1, wherein the inner boundary or the outer boundary of the overlapping area of the first projector or the second projector is selected, by forming a diagonal line between a sub-area of the inner boundary or the outer boundary of the first test pattern and a sub-area diagonal thereto, and then dragging the diagonal line to form a bending line.

8. The method for homogenizing the images of the plurality of projectors according to claim 1, wherein a brightness changes from the inner boundary to the outer boundary of the overlapping area by gradually reducing from a maximum brightness to a minimum brightness of the first projector.

9. A device for homogenizing images of a plurality of projectors, comprising a user interface and a processor, wherein:
the processor controls the user interface, and is configured to execute:
projecting a first test pattern on respective projection images of the plurality of projectors, wherein a projection image of a first projector and a projection image of a second projector among the plurality of projectors have an overlapping area, and the first test pattern is made up of a plurality of grid lines;
selecting, in the grid lines of the first test pattern on the projection image of the first projector, an inner boundary and an outer boundary of the overlapping area of the first projector;
selecting, in the grid lines of the first test pattern on the projection image of the second projector, an inner boundary and an outer boundary of the overlapping area of the second projector; and
gradually decreasing a brightness from the inner boundary to the outer boundary of the overlapping area of the first projector, and gradually decreasing a brightness from the inner boundary to the outer boundary of the overlapping area of the second projector.

10. The device for homogenizing the images of the plurality of projectors according to claim 9, the processor further comprises executing:
projecting a second test pattern on respective projection images of the plurality of projectors, wherein a pitch of the grid lines of the second test pattern is smaller than a pitch of the grid lines of the first test pattern.

11. The device for homogenizing the images of the plurality of projectors according to claim 9, wherein the first test pattern projected by the first projector and the first test pattern projected by the second projector are projected simultaneously or time-sharingly.

12. The device for homogenizing the images of the plurality of projectors according to claim 9, wherein the projection image serves as the user interface to select the inner boundary and the outer boundary of the overlapping area of the first projector, and to select the inner boundary and the outer boundary of the overlapping area of the second projector.

13. The device for homogenizing the images of the plurality of projectors according to claim 9, wherein the selection of the inner boundary and the outer boundary of the overlapping area of the first projector, and the selection of the inner boundary and the outer boundary of the overlapping area of the second projector are performed on the user interface.

14. The device for homogenizing the images of plurality of the projectors according to claim 9, wherein the inner boundary and the outer boundary of the overlapping area of the first projector or the second projector are selected by clicking each sub-area of the first test pattern, or by dragging from a first sub-area to a last sub-area.

15. The device for homogenizing the images of the plurality of projectors according to claim 9, wherein the inner boundary or the outer boundary of the overlapping area of the first projector or the second projector is selected, by forming a diagonal line between a sub-area of the inner boundary or the outer boundary of the first test pattern and a sub-area diagonal thereto, and then dragging the diagonal line to form a bending line.

16. The device for homogenizing the images of the plurality of projectors according to claim 9, wherein a brightness changes from the inner boundary to the outer boundary of the overlapping area by gradually reducing from a maximum brightness to a minimum brightness of the first projector.

* * * * *